3,812,183
PREPARATION OF MONOHALOACETYL HALIDES
Virgil W. Gash and Donald E. Bissing, Ballwin, Mo., assignors to Monsanto Company, St. Louis, Mo.
No Drawing. Continuation-in-part of abandoned application Ser. No. 185,402, Sept. 30, 1971. This application July 31, 1972, Ser. No. 276,280
The portion of the term of the patent subsequent to Feb. 26, 1991, has been disclaimed
Int. Cl. C07c 53/02, 51/58
U.S. Cl. 260—544 Y     1 Claim

ABSTRACT OF THE DISCLOSURE

A process for the preparation of monohaloacyl halides by halogenating ketenes in the presence of an alkoxyalkyl ester.

---

This application is a continuation-in-part of copending application Ser. No. 185,402 filed Sept. 30, 1971, now abandoned.

This invention relates to the preparation of monohaloacyl halides by the liquid phase halogenation of ketenes. More particularly, this invention relates to the halogenation of ketenes in the presence of a solvent or a reaction medium that inhibits or prevents the formation of polyhaloacyl halides and minimizes the formation of acyl halides. The term "halogen" as used herein includes chlorine, bromine, iodine and halogen halides such as iodine monochloride, iodine monobromide, bromine monochloride and the like.

The liquid phase halogenation of ketene is well known but the previously known methods of conducting this reaction have resulted in the formation of monohaloacetyl halides contaminated with a considerable proportion of polyhaloacetyl halides. These earlier methods utilized such solvents as chlorinated benzenes, nitrobenzene, carbon tetrachloride, ethyl acetate, chloroacetyl chloride, acetyl chloride, 1,2 - dichloroethane, acetonitrile, benzonitrile, nitromethane and various other solvents. Each of these solvents had a common shortcoming; that is, they all resulted in the formation of a considerable amount of dihaloacetyl halide, together with the desired product, monohaloacetyl halide. In some of these solvents, the undesired trihaloacetyl halides were also formed. The dihalo derivatives have no commercial utility and their separation from the monohalo derivative is expensive and time consuming. For example, dichloroacetyl chloride has a boiling point of approximately 107° C. whereas monochloroacetyl chloride has a boiling point of about 105° C. This proximity of the boiling points of these two compounds renders their separation exceedingly difficult and also adds an expensive and uneconomical step to the halogenation process when utilized in the previously known solvents.

The monohaloacetyl halides produced by the process of this invention are valuable intermediates in the production of herbicidal alpha-haloacetoanilides and other products. By contrast, the corresponding di- and trihaloacetyl halides have no commercial significance. In other words, they are present merely as diluents which detract from the efficacy of the commercially valuable monohaloacetyl halides. The severity of the problem is evidenced by the fact that all commercially available chloroacetyl chloride is contaminated with appreciable amounts of dichloroacetyl chloride, and in some instances the dichloroacetyl chloride content is as great as six percent.

In accordance with the present invention, the disadvantages of the prior art solvents are overcome by the halogenation of a ketene in the presence of an alkoxyalkyl ester of the formula

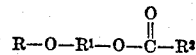

wherein R and $R^2$ are each alkyl having a maximum of 5 carbon atoms, and $R^1$ is alkylene having a maximum of 5 carbon atoms with the total number of carbon atoms in R, $R^1$ and $R^2$ being at least 3 and not greater than 10.

The process of the present invention encompasses the halogenation of ketene, i.e. $CH_2=C=O$, as well as substituted ketenes, such as methyl ketene, dimethyl ketene, ethyl ketene, diethyl ketene, phenyl ketene, diphenyl ketene and the like.

While 2-methoxyethyl acetate is generally preferred, other alkoxyalkyl esters can be used alone or in any combination for the purposes of this invention. Suitable esters include, for example, 2-methoxyethyl acetate, 2-ethoxyethyl acetate, 2-propoxyethyl acetate, 2-butoxyethyl acetate, 2-pentoxyethyl acetate, methoxymethyl acetate, ethoxymethyl acetate, propoxymethyl acetate, butoxymethyl acetate, pentoxymethyl acetate, methoxypropyl acetate, ethoxypropyl acetate, propoxypropyl acetate, butoxypropyl acetate, pentoxypropyl acetate, methoxybutyl acetate, ethoxybutyl acetate, propoxybutyl acetate, butoxybutyl acetate, pentoxybutyl acetate, methoxypentyl acetate, ethoxypentyl acetate, propoxypentyl acetate, butoxypentyl acetate, and the corresponding propionates, butyrates and valerates having a maximum of 10 carbon atoms in the alkyl and alkylene groups.

In carrying out the process of the present invention, a ketene and the halogen are introduced into the solvent medium where they react to form a monohaloacyl halide which is separated from the reaction medium by conventional means such as distillation, preferably at reduced pressure. The process is amenable to either continuous or to batch type operation. The operating conditions under which the reaction is conducted are not critical but it is preferred to maintain them within specified limits to maximize the yield of the monohaloacyl halides. In essence, it is only necessary that the ester is liquid under reaction conditions. Because of practical considerations, however, the reaction is normally conducted within the approximate temperature range of −50° C. to 150° C. at a pressure from about 50 mm. Hg to about 2 atmospheres. In most instances, however, it is preferred to operate at a temperature between about 0° C. and about 110° C. at a pressure between about 75 mm. and about 760 mm. The reaction of the halogen and the ketene progresses to form monohaloacyl halides while minimizing formation of the corresponding polyhalo compound regardless of the mole ratio of the reactants. The advantages of the present invention are more fully realized, however, when the mole ratio of halogen to ketene is maintained between about 0.8:1 and about 2:1 and optimum results are obtained with mole ratios of halogen to ketene between about 1:1 and about 1.3:1. The presence of an alkoxyethyl ester of the present invention in the reaction medium minimizes the formation of acyl halides and substantially reduces the formation of dihaloacyl halides and other polyhalogenated by-products.

In accordance with the present invention, the alkoxyalkyl ester can constitute substantially all or only a minor portion of the reaction medium. The benefits of the is high, i.e. about 85–90 percent and the amount of dihaloacyl halide produced is minimized, i.e. a yield of less than about 5 percent.

TABLE I

| Example number | 2 | 3 | 4 | 5 | 6 |
|---|---|---|---|---|---|
| Solvent | 2-pentoxyethyl acetate. | 3-butoxypropyl acetate. | 4-methoxybutyl acetate. | 2-methoxyethyl acetate. | 3-methoxypropyl acetate. |
| Pressure (mm. Hg) | 100 | 125 | 100 | 150 | 760. |
| Temperature (° C.) | 25 | 30 | 15 | 10 | 30. |
| Ketene | Ketene | Ketene | Ketene | Ketene | Phenyl ketene. |
| Halogen | Chlorine | Chlorine | Chlorine | Bromine | Chlorine. |
| Solvent amount (parts) | 250 | 200 | 300 | 300 | 170. |
| Hologen Amount (parts) | 170 | 127 | 254 | 250 | 60. |
| Ketene Amount (parts) | 100 | 75 | 150 | 50 | 100. |
| Haloacyl Halide | Chloroacetyl chloride. | Chloroacetyl chloride. | Chloroacetyl chloride. | Bromoacetyl bromide. | 2-chloro-2-phenylacetyl chloride. |
| Dihaloacyl Halide | Dichloroacetyl chloride. | Dichloroacetyl chloride. | Dichloroacetyl chloride. | Dibromoacetyl bromide. | 2,2-dichloro-2-phenyl-acetyl chloride. | present invention are most pronounced when the solvent weight ratio is high but substantial benefits are realized even when the ester is present in relatively small amounts. The weight ratio of the alkoxyalkyl ester to the sum of the ester and the product, i.e., the solvent weight ratio, can vary from about 0.05:1 to about 0.99:1. In fact, during the normal course of a batch reaction, the solvent weight ratio diminishes with the formation of the product which becomes mixed with the ester forming the reaction medium. In the practice of the continuous process, the solvent weight ratio can be maintained constant or varied to desired levels.

The invention will be more clearly understood from the following detailed description of specific examples thereof. In these examples and throughout the specification all proportions are expressed in parts by weight unless otherwise indicated.

EXAMPLE 1

About 168 parts (Solvent Amount) of 2-methoxyethyl acetate (Solvent) were charged into a suitable reaction vessel provided with agitation means, a gas outlet, temperature recording means and two gas spargers below the level of the 2-methoxyethyl acetate. With continuous agitation at atmospheric pressure (Pressure) with the reaction medium maintained at a temperature of approximately 24° C. (Temperature) ketene (Ketene) and chlorine (Halogen) were introduced through separate spargers at constant and substantially equimolar rates. After about 3 hours, the addition of the reactants was terminated. About 192 parts (Halogen Amount) chlorine and about 98 parts (Ketene Amount) ketene had been added during the course of the reaction. At the termination of the reaction, the ratio of the solvent to the sum of the solvent and product was about 0.46:1. The reaction mixture contained 2-methoxyethyl acetate, chloroacetyl chloride (Haloacyl Halide) and small amounts of acetyl chloride and dichloroacetyl chloride (Dihaloacyl Halide). Upon distillation to recover the solvent and to separate the chloroacetyl chloride, the mole percent yield of chloroacetyl chloride was determined to be on the order of 89%. About 2.7% dichloroacetyl chloride and about 8% acetyl chloride were also formed.

Although in this example the reaction mass was agitated, agitation is not necessary in the halogenation process of this invention. When bromine is the halogen, it is preferred to agitate the reaction mass but good results are also obtained without agitation.

Following the general procedure of Example 1 but with conditions and materials changed as noted in Table I the indicated products are obtained. The line titles of Table I are shown in parenthesis in the description of Example 1 where appropriate.

In Examples 2 through 6 the yield of haloacyl halide

In order to illustrate the advantages of the solvents of the present invention, the procedure of the foregoing Example 1 was substantially duplicated using other solvents. The percent yields thus obtained, together with the results of Example 1 are tabulated below in Table II.

TABLE II

| Solvent | Chloroacetyl chloride yield | Acetyl chloride yield | Dichloroacetyl chloride yield | Solvent recovered (percent) |
|---|---|---|---|---|
| Example 1 | 89 | 8 | 2.7 | 93 |
| Ethyl Acetate | 92 | 5 | 2.9 | 78 |
| Carbon Tetrachloride | 42 | 43 | 15 | 75 |
| 1,2-dichloroethylene | 35 | 41 | 24 | 90 |
| Methyl acetate | 91 | 4 | 4 | 88 |
| Acetonitrile | 46 | 47 | 7 | 66 |
| Nitromethane | 48 | 39 | 13 | 71 |
| n-Butyl Acetate | 82 | 15 | 3 | 84 |
| n-Hexyl Acetate | 81 | 15 | 4 | 83 |
| Benzonitrile | 87 | 9 | 4 | 92 |

By the above comparison of the same procedure utilizing previously known solvents, it is self-evident that utilization of the solvents of the present invention substantially suppresses the formation of dichloroacetyl chloride. It is also evident that this solvent system minimizes the formation of acetyl chloride and dichloroacetyl chloride without undergoing extensive degradation or reaction itself which would lead to additional contaminants and chlorinated impurities in the chloroacetyl chloride produced. The high solvent recovery indicates that this solvent is intrinsically effective in this reaction.

The beneficial results of the present invention are obtained in like manner with other solvents under consideration as well as with bromine and the other aforementioned halogenating agents. Bromine can be introduced into the system as the liquid, combined with the ester in solution, or in the gaseous state below the surface of the reaction mass. In most instances it is preferred to conduct brominations in accordance with this invention by using a solution of bromine in the ester solvent. When iodine monochloride is used as the halogenating agent, it can be charged into the reactor by dissolving it in the ester solvent and then adding the resulting solution to the system.

Although the invention has been described with respect to specific modifications, the details thereof are not to be construed as limitations except to the extent indicated in the following claim.

We claim:

1. A process for the preparation of chloroacetyl chloride which comprises reacting ketene and chlorine in the presence of 2-methoxyethyl acetate.

References Cited

UNITED STATES PATENTS 2,862,964   12/1958   Lacey _____ 260—544 Y

LORRAINE A. WEINBERGER, Primary Examiner

R. D. KELLY, Assistant Examiner